F. A. LITTLEFIELD.
STEAM TRAP.
APPLICATION FILED FEB. 4, 1909.
1,148,459.
Patented July 27, 1915.
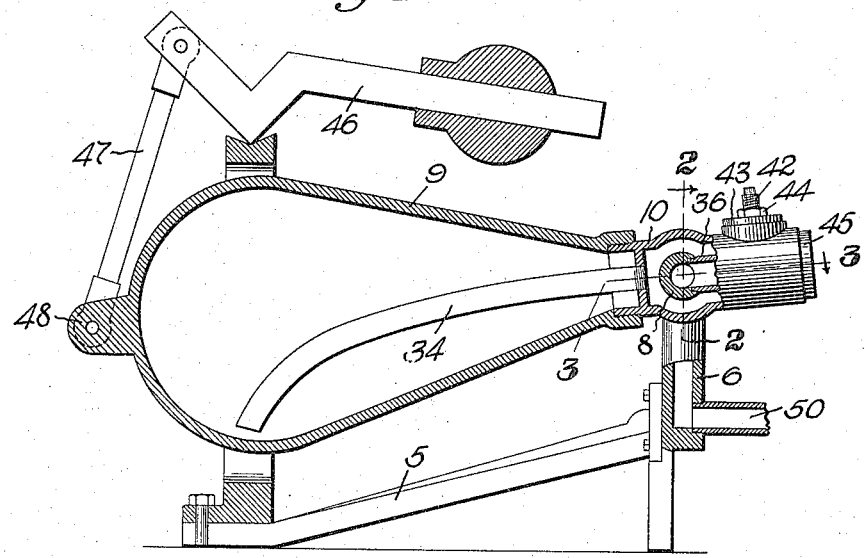
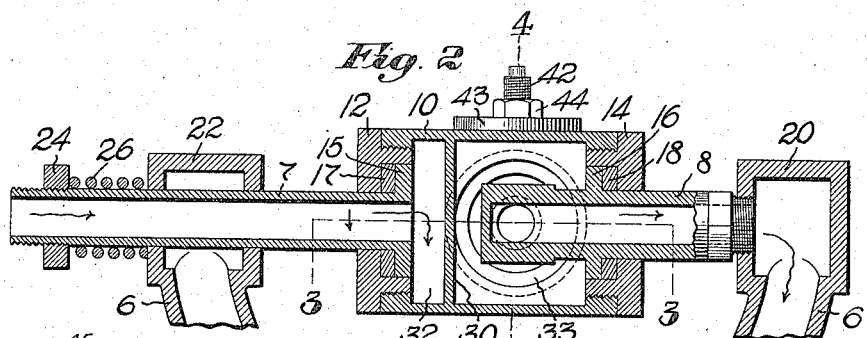
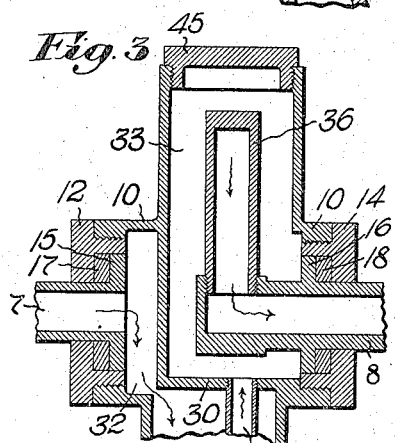
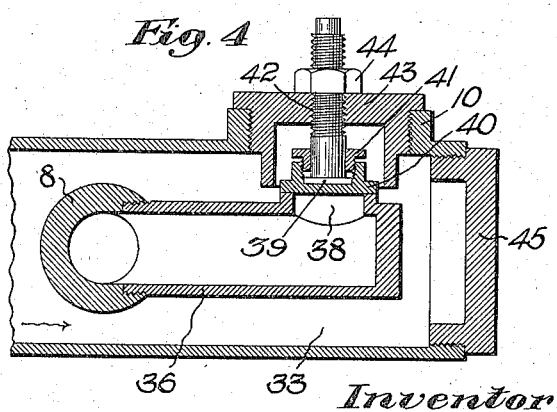
Witnesses:
Horace H. Crossman
Robert H. Kammler
Inventor:
Frank A. Littlefield
by Emery & Booth, Attys.

UNITED STATES PATENT OFFICE.

FRANK A. LITTLEFIELD, OF NASHUA, NEW HAMPSHIRE, ASSIGNOR TO NASHUA MACHINE COMPANY, OF NASHUA, NEW HAMPSHIRE, A CORPORATION OF MAINE.

STEAM-TRAP.

1,148,459.  Specification of Letters Patent.  Patented July 27, 1915.

Application filed February 4, 1909.  Serial No. 476,069.

*To all whom it may concern:*

Be it known that I, FRANK A. LITTLEFIELD, a citizen of the United States, residing at Nashua, in the county of Hillsboro, State of New Hampshire, have invented an Improvement in Steam-Traps, of which the following description, in connection with the accompanying drawings, is a specification, like numerals on the drawings representing like parts.

This invention pertains to steam traps; and may be embodied advantageously in that type of trap shown and described in my United States Letters Patent No. 893,529, dated July 14, 1908.

Among other objects, the invention is designed to simplify the construction, organization and mode of operation of steam traps and to obviate liability to derangement in use.

The invention may be described conveniently by reference to that type of steam trap familiarly known as the "tilting trap", one form thereof being shown in my patent aforesaid. For illustration a trap of the type suggested embodying the present invention, is shown in the accompanying drawings, in which,—

Figure 1 is a side elevation, partly in section on a vertical median plane, of an organized tilting trap embodying the invention; Fig. 2 is a section on an enlarged scale in a vertical plane on the line 2—2 of Fig. 1, viewed from the left in Fig. 1; Fig. 3 is a horizontal section, on the same scale as Fig. 2, on a line 3 of Fig. 1, and a line 3'—3' of Fig. 2; and Fig. 4 is a vertical section, on a still further enlarged scale, on the line 4—4 of Fig. 2, viewed from the right in Fig. 2.

Referring to Fig. 1 a base or tripod 5 is provided to support various parts of the trap. It has a tubular yoke 6 (see Fig. 2) the arms of which respectively support an inlet pipe 7 and an outlet pipe 8, which serve in the character of stud shafts upon which the tilting bowl 9 is mounted. A chambered head 10 threads into the neck of the bowl 9 and, as shown in Fig. 2, has plugs 12, 14, threading into the head and supplying the bearings for the bowl, mounted upon the respective pipes 7 and 8. In order that the joints between the head 10 and the pipes 7 and 8 may be efficiently closed against leakage and waste of steam pressure, the inner end of the pipe 7 is provided with a rigid collar 15 and the pipe 8 with a similar collar 16. Between the plug 12 and collar 15 is interposed a packing ring 17; and between the plug 14 and collar 16 is interposed a packing ring 18. These packing rings and the parts in embracing relation thereto, may be held in suitable contact by the organization shown in Fig. 2. As illustrated the pipe 8 threads into the head 20 of one yoke arm 6; and thereby said pipe 8 and its collar 16 are held stationary while the bearing plug 14 is capable of axial movement thereon. The other pipe 7 is so supported in the head 22 of the other yoke arm 6 as to permit said pipe axial movement in the head 22. The pipe 7 has thereon a nut 24 between which and the head 22 is interposed a coil spring 26, tending to move the pipe 7 toward the left in Fig. 2. Thus the spring 26 tends to force the head 15 of the pipe 7 toward the left, so as to press the packing ring 17 between said collar 15 and the plug 12, thereby securing a tight joint. In like manner the spring 26 tends to force the entire head 10 toward the left, thereby pressing the packing ring 18 between the plug 14 and the collar 16 on the pipe 8. Steam pressure within the head 10 contributes to the effect of the spring 26 just described. For instance pressure in the head acting upon the collar 15 of the pipe 7 tends to press the same into still firmer contact with the packing ring 17 to close the joint; and the reaction tends similarly to close the joint of the packing ring 18.

Those parts of the illustrative form of trap just described, may be similar to those shown and described in my aforesaid patent. The head 10 has preferably a partition 30, separating the interior of the head into an inlet chamber 32 and an outlet chamber 33. As shown in Fig. 3 the inlet chamber leads from the inlet pipe 7, and communicates directly with the interior of the bowl 9, as indicated by the arrows in Fig. 3. Fixed in the partition 30 (Fig. 3) and communicating with the chamber 33 is a pipe 34, which projects into the bowl 9 and supplies a conduit for the escape of water from the interior of the bowl. The chamber 33 preferably incloses the inner end of the pipe 8, into which is threaded a second pipe 36, the latter having therein a port 38 surrounded by a suitable seat for the valve 40. The valve 40 may be a disk valve with its upper side in the form of a nut to receive a screw plug 41. The valve 40 and plug 41 receive between them a flanged head 39 of a stem 42; and preferably the valve 40 and plug 41 are sufficiently spaced apart to permit the flanged head 39 a slight amount of play therebetween. The stem 42 threads into a plug 43 which in turn threads into a suitable aperture in the head 10. A lock nut 44 is mounted upon the stem 42. The outer end of the head 10 may be closed by a plug 45, which completes the closure of the chamber 33.

The tilting of the bowl 9 is preferably governed by means of a weighted lever 46, connected by a link 47, with an ear 48 on the bowl 9. In the particular form of weighted lever and link connection shown, the operation of the trap is rendered desirably prompt and accurately responsive to predetermined conditions of water in the bowl 9—as described in my aforementioned patent.

With the illustrative construction and organization hereinbefore described, water entering the inlet pipe 7, flows into the chamber 32 and thence into the bowl; the latter, assuming it to be empty, standing then in the position shown in Fig. 1. When in this position the valve 40 (Fig. 4) is seated firmly upon its seat at the port 38 and closes the same so that all egress from the chamber 33 is cut off. The bowl 9 and connected parts including the valve 40 are maintained in this position by the counterbalance weight of the lever 46 holding the bowl 9 in the elevated position of Fig. 1. There may be present in the chamber 33 some steam under pressure and this acting upon the outer face of the valve 40 and connected parts, tends to assist in holding the same firmly seated. When a sufficient amount of water is accumulated in the bowl 9 it overcomes the counterbalance of the weighted lever 46 and thereupon the bowl 9 and head 10 tilt contraclockwise in Figs. 1 and 2—the pipes 8 and 36 remaining stationary. This rocking of the bowl and head 10 lifts the valve 40 from its seat and opens the port 38, thereby permitting the head of steam back of the water in the bowl 9 to force the water out through the pipe 34, into the chamber 33, through the port 38, into the outlet pipe 8, through the yoke arm 6, and out at the pipe 50 (Fig. 1). When the water has been forced out of the bowl 9 the weighted lever 46 tilts the bowl 9 and head 10 clockwise, back to the position of Fig. 1; and thereby the valve 40 is reseated to close the port 38, and the described operation of filling and emptying the bowl may be automatically repeated.

As already pointed out the valve 40 and plug 41 are spaced apart sufficiently to permit some play therebetween of the flanged head 39 of the stem 42. By this arrangement when the bowl 9 begins its contraclockwise movement preliminary to a discharge of water, the valve 40 is permitted to remain seated until the movement of the bowl 9 and head 10 has progressed somewhat and gotten well under way; and thereupon during a rapid part of the bowl movement, the valve 40 is quickly snatched from its seat and the port 38 suddenly opened wide to permit a prompt discharge, as described. In like manner upon the clockwise return movement of the bowl and head 10 after a discharge operation, the valve 40 regains its seat while the bowl is still moving, i. e., before the bowl has reached its final position of rest and while it is moving with substantial rapidity. In this manner the opening and closing of the port 38 by the valve 40 may be effected very rapidly and effectively.

The illustrative organization of the various parts described is advantageous. For instance, the plugs 12 and 14 are readily removable for inspection and repair of the packing rings 17 and 18. Likewise the plug 43 is readily removable to permit inspection or removal of the valve 40. The valve may be adjusted in relation to the plug 43, and head 10, which carry it, by turning the stem 42, and the latter may be locked in adjusted position by means of the lock nut 44. The amount of play to be permitted between the flanged head 39 of the stem 42 and the valve 40 may be readily adjusted by turning the plug 41. To permit inspection, removal or repair of the pipe 36 and the valve seat thereon, the plug 45 may be readily removed and the pipe 36 unscrewed from its seat in the pipe 8. As will appear to those skilled in the art the entire mechanism may be readily disorganized and reassembled.

The prompt and efficient action of the described tilting trap, under the influence of the illustrative type of weighted lever 46, and link connection 47, coöperates desirably with the described construction of valve mechanism.

While the specific construction and organization above described commends itself for various reasons, it is to be understood that the invention is by no means limited to the specific details particularly described and shown for illustration. On the contrary the illustrative embodiment may be variously changed and modified within the proper scope of the subjoined claims. It is not indispensable that all the features of the invention be used conjointly, since they may be used to advantage separately.

Claims:

1. A tilting steam trap comprising in combination, a tilting bowl having a counterweight upon the same side of the tilting axis as the bowl; a chambered head rigid with the bowl and tilting therewith; a stationary outlet pipe in a chamber of said head; and a valve mounted on the wall of said head and movable therewith toward and from said stationary outlet pipe.

2. A tilting steam trap comprising in combination a tilting chambered head; means operable by accumulated water to tilt said head; and a valve carried by and inclosed in said head; mechanical means for operating said valve by the tilting of said head, and a removable plug in the outer wall of said head and adjacent said valve giving ready access thereto.

3. A tilting steam trap comprising in combination a tilting chambered head; means operable by accumulated water to tilt said head; and an adjustable valve inclosed in said head and operated by the tilting thereof, a closure carried by said head adjacent said valve and permitting when open the adjustment of said valve.

4. A tilting steam trap comprising in combination a tilting chambered head; means operable by accumulated water to tilt said head; a plug 43 removable from said head; and a valve carried by said plug and inclosed in said head and operated by the tilting thereof.

5. A tilting steam trap, comprising, in combination, a tilting bowl, a chambered head rigid with said bowl and tilting therewith; a stationary outlet pipe in a chamber of said head; a valve located within said head to open and close said outlet pipe; a removable cap for said chamber, and a support for said valve threaded into said cap.

6. A tilting steam trap comprising, in combination, a tilting bowl, a chambered head rigid with said bowl and tilting therewith, a stationary outlet pipe in a chamber of said head; a valve located within said head to open and close said outlet pipe; and a stem carried by said head within said chamber upon which stem said valve is longitudinally slidable toward and away from its seat.

7. A tilting steam trap, comprising, in combination, a tilting bowl, a chambered head rigid with said bowl and tilting therewith; a stationary outlet pipe in a chamber of said head; a valve located within said head to open and close said outlet pipe; a stem carried by said head within said chamber upon which stem said valve is longitudinally slidable toward and away from its seat, and means to limit such slidable movement of said valve.

8. A tilting steam trap comprising, in combination, a tilting bowl; a chambered head rigid with said bowl and tilting therewith; a stationary outlet pipe in a chamber of said head; a valve located within said head to open and close said outlet pipe; a stem carried by said head within said chamber, upon which stem said valve is longitudinally slidable toward and away from its seat, said stem being provided with a head; and means forming with said valve a chamber in which the head of said stem is freely movable to a limited extent longitudinally thereof.

9. A tilting steam trap comprising, in combination, a tilting bowl; a chambered head rigid with said bowl and tilting therewith; a stationary outlet pipe in a chamber of said head; a valve located within said head to open and close said outlet pipe; a stem carried by said head within said chamber, upon which stem said valve is longitudinally slidable toward and away from its seat, said stem being provided with a head; and a plug having screw-threaded engagement with said valve and forming therewith a chamber in which the head of said stem is freely movable to a limited extent longitudinally thereof.

10. A tilting steam trap comprising, in combination, a tilting bowl; a chambered head rigid with said bowl and tilting therewith; a stationary outlet pipe in a chamber of said head; a valve located within said head to open and close said outlet pipe; a cap for said chamber having screw-threaded engagement with said head; and a support carried by said cap for moving said valve toward and away from its seat.

11. A tilting steam trap comprising, in combination, a tilting bowl; a chambered head rigid with said bowl and tilting therewith; a stationary outlet pipe in a chamber of said head; a valve located within said head to open and close said outlet pipe; a cap for said chamber having screw-threaded engagement with said head; and a support having screw-threaded engagement with said cap for moving said valve toward and away from its seat.

12. A steam trap comprising, in combination, a pivoted head; a valve and seat within said head, the former being exteriorly accessible for adjustment to different operable positions relatively to said seat; inlet and outlet conduits coaxially disposed with relation to said head and one having a port controlled by said valve; packings for the joints between said conduits and said head; and means permitting pressure within said head to exert a compressive action against said packings.

13. A steam trap comprising, in combination, a pivoted head; a valve within said head and having an adjustable spindle mounted in the outer wall thereof; an outlet conduit passing into and coaxially disposed with relation to said head; and having a port controlled by said valve; a flange on said conduit exposed to pressure within said head; a packing interposed between one end of said flange and a portion of said head, and a spring for urging said flange against said packing.

14. A tilting steam trap comprising in combination a tilting bowl having a counterweight upon the same side of the tilting axis as the bowl; a chambered head rigid with the bowl and tilting therewith; a stationary outlet pipe and a chamber in said head; and a valve mounted on the outer wall of said head and exteriorly accessible, said valve being movable with the head toward and from said stationary outlet pipe.

15. A tilting steam trap comprising in combination a tilting bowl; a chambered head rigid with said bowl and tilting therewith; a stationary pipe communicating with the interior of said chambered head; and a single valve eccentric to the tilting axis of said bowl, mounted on said head and exteriorly accessible for adjustment, said valve controlling the outlet between said pipe and the interior of said head.

In testimony whereof, I have signed my name to this specification, in the presence of two subscribing witnesses.

FRANK A. LITTLEFIELD.

Witnesses:
JOHN R. SPRING,
C. K. ASHE.

Copies of this patent may be obtained for five cents each, by addressing the "Commissioner of Patents, Washington, D. C."